(12) United States Patent
Bierl et al.

(10) Patent No.: US 9,004,831 B2
(45) Date of Patent: Apr. 14, 2015

(54) MACHINE TOOL COMPRISING A MACHINE SPINDLE, A TOOL HOLDER AND A CONTACT POINT FOR ELECTRIC CURRENT OR DATA TRANSMISSION

(75) Inventors: Wolfgang Bierl, Gueglingen (DE); Juergen Fronius, Walheim/Neckar (DE); Heiko Graf, Gerlingen (DE); Ewald Hasselkuss, Fellbach (DE); Roland Hoerl, Boennigheim (DE)

(73) Assignee: Komet Group GmbH, Besigheim (DE)

( * ) Notice: Subject to any disclaimer, the term of this patent is extended or adjusted under 35 U.S.C. 154(b) by 864 days.

(21) Appl. No.: 13/138,450

(22) PCT Filed: Mar. 25, 2010

(86) PCT No.: PCT/EP2010/053895
§ 371 (c)(1),
(2), (4) Date: Aug. 16, 2011

(87) PCT Pub. No.: WO2010/127908
PCT Pub. Date: Nov. 11, 2010

(65) Prior Publication Data
US 2011/0299953 A1    Dec. 8, 2011

(30) Foreign Application Priority Data
May 8, 2009   (DE) .......................... 10 2009 020 509

(51) Int. Cl.
*B23Q 5/04*       (2006.01)
*B23Q 1/00*       (2006.01)
*B23Q 3/12*       (2006.01)

(52) U.S. Cl.
CPC ................ *B23Q 1/0009* (2013.01); *B23Q 3/12* (2013.01)

(58) Field of Classification Search
USPC ............ 439/17, 289, 700; 409/230–232, 144, 409/186–188, 193–195, 207, 209; 483/7–11
See application file for complete search history.

(56) References Cited

U.S. PATENT DOCUMENTS 4,171,496 A * 10/1979 Eriksson ..................... 310/219
5,069,524 A * 12/1991 Watanabe et al. ............... 385/59
(Continued)

FOREIGN PATENT DOCUMENTS

DE   2 042 506       3/1972
DE   85 29 200 U1    2/1986
(Continued)

OTHER PUBLICATIONS

Form PCT/ISA/237 dated Jul. 21, 2010 (6 pages).
Form PCT/ISA/210 dated Jul. 21, 2010 (3 pages) together with English translation of categories of documents cited.
(Continued)

*Primary Examiner* — Daniel Howell
*Assistant Examiner* — Nicole N Ramos
(74) *Attorney, Agent, or Firm* — Flynn, Thiel, Boutell & Tanis, P.C.

(57) ABSTRACT

A machine tool having a motor-driven machine spindle which can be rotated about a spindle axis. The machine spindle has a tool holder arranged at the face. A tool is exchangeably arranged on the machine spindle. The tool has a coupling element which is compatible with the tool holder of the machine spindle. The coupling element has a rear surface pointing toward the machine spindle. The machine tool has at least one galvanic contact point for the electric current or data transmission, the point being arranged between the machine spindle and the tool and rotating together with the machine spindle. The galvanic contact point has a contact element which is arranged at the face of the tool holder on the spindle side, and a contact element which is arranged on the rear surface of the coupling element on the tool side.

43 Claims, 9 Drawing Sheets

(56) References Cited

U.S. PATENT DOCUMENTS

| | | | | |
|---|---|---|---|---|
| 5,109,223 | A * | 4/1992 | Schmitt et al. | 340/870.31 |
| 5,636,950 | A | 6/1997 | Gothberg et al. | |
| 6,554,551 | B1 * | 4/2003 | Marelli | 409/201 |
| 7,883,303 | B2 * | 2/2011 | Tang et al. | 409/232 |
| 7,938,603 | B2 * | 5/2011 | Tatsuda et al. | 409/216 |
| 8,044,822 | B2 * | 10/2011 | Hoerl et al. | 340/870.31 |
| 2003/0103826 | A1 * | 6/2003 | Watanabe | 409/201 |
| 2009/0080990 | A1 * | 3/2009 | McMurtry et al. | 408/226 |

FOREIGN PATENT DOCUMENTS

| | | |
|---|---|---|
| DE | 38 13 949 A1 | 11/1989 |
| DE | 200 09 183 U1 | 9/2000 |
| EP | 0 718 064 A1 | 6/1996 |
| WO | WO 2006/100451 A1 | 9/2006 |

OTHER PUBLICATIONS

German Search Report issued in the German Patent Office dated Mar. 4, 2010 (4 pages) with English translation of p. 2.

* cited by examiner

MACHINE TOOL COMPRISING A MACHINE SPINDLE, A TOOL HOLDER AND A CONTACT POINT FOR ELECTRIC CURRENT OR DATA TRANSMISSION

BACKGROUND OF THE INVENTION

The invention relates to a machine tool having a motor-driven machine spindle which can be rotated about a spindle axis and has an end-side tool holder, and having an inserted tool which is arranged exchangeably on the machine spindle and has a coupling element which is compatible with the tool holder of the machine spindle and has a rear face which points to the machine spindle, having an end face which comprises the tool holder and lies opposite the rear face of the coupling element, and having at least one co-rotating galvanic contact point for electric current or data transmission, which contact point is arranged between the machine spindle and the inserted tool and has a spindle-side contact element which is arranged on the end face of the tool holder and a tool-side contact element which is arranged on the rear face of the coupling element.

Machine tools of this type are known. Here, there is an electric line in the machine spindle through which an inserted tool which is received on the machine spindle can be supplied with electric energy. The inserted tool is received with a coupling element in a tool holder on the machine spindle. The tool holder of the machine spindle comprises a planar face. The coupling element of the inserted tool which is received on the machine spindle bears with a planar annular face against the tool holder of the machine spindle. The planar face and the planar annular face can be pressed against one another by means of a coupling mechanism. Planar contact is produced as a result. In each case, one electric line contact is provided on the planar face of the machine spindle and on the planar annular face of the tool holder. When the inserted tool is connected to the machine spindle, these contacts are pressed against one another on account of spring force. The electric line in the machine spindle is then connected to a consumer in the inserted tool.

SUMMARY OF THE INVENTION

It is an object of the invention to provide a machine tool which makes it possible, even at high rotational speeds, to reliably transmit electric energy and/or data via a contact point which is formed on the end face or planar face of the machine spindle into a tool holder, in order to supply current to a powerful consumer in an inserted tool which is situated in the tool holder.

This object is achieved by a machine tool of the type mentioned in the introduction, in which the spindle-side contact element and the tool-side contact element can be moved relative to one another, under the action of a centrifugal force component which occurs during the rotation of the machine spindle about the spindle axis, and can be pressed against one another with the production of contact.

The invention is based on the finding that contact points or interfaces for the transmission of electric energy from a machine spindle into an inserted tool, which contact points or interfaces provide electric line contacts on the conical holder of the machine spindle and on the shaft of the inserted tool coupling element, can be operated reliably only with high outlay. This is due to the high pressing forces in this machine section. Moreover, line contacts in this machine section can be exchanged or repaired only with great outlay, since this machine section is accessible only with difficulty.

A further finding, on which the invention is based, is that holders for electric contact elements are advantageously arranged on the machine spindle and on the coupling element of the inserted tool in an inclined manner in relation to the spindle axis. This not only makes it possible for the electric contact elements to be pressed against one another in a manner assisted by centrifugal force. The inclined arrangement of the holders affords, in particular, the possibility to use comparatively large volume contact elements at the planar or end face of the machine spindle, without the mechanical load-bearing capability of the planar face of the machine spindle or a rear face of the coupling element being weakened here, for example the planar annular face of a coupling element of the inserted tool, which coupling element is configured as a hollow shaft cone interface. This means that inclined electric contact elements and bearing devices can be configured on the planar face of the machine spindle and the planar annular face of the coupling element, without impairing the stability and the oscillation and torsion behavior of the composite tool which is formed by the machine spindle and the tool holder with the inserted tool.

The rear face of the coupling element can be, in particular, a planar annular face which surrounds the coupling element. The end face of the tool holder of the machine spindle is preferably a planar face. During the coupling operation, the planar annular face which surrounds the coupling element can then be pressed against the planar face of the tool holder with the formation of a planar contact.

The spindle-side contact element or the tool-side contact element can preferably be moved in a direction under the action of the centrifugal force component, in which direction the tool-side or the spindle-side contact element is situated, the spacing from the spindle axis increasing.

The spindle-side contact element is preferably arranged in an inclined holder which encloses an acute angle with the spindle axis and is open toward the planar face of the machine spindle. The acute angle is preferably from 5° to 45°; a value of 20° is particularly favorable.

By virtue of the fact that, starting from the planar face of the machine spindle, the inclined holder extends in a direction which points away from the spindle axis, it is possible to provide a rigid electric contact element on the end face of the machine spindle and to arrange a movable contact element in the more accessible tool holder.

The spindle-side contact element is therefore preferably arranged rigidly in the machine spindle. By virtue of the fact that the spindle-side contact element has a planar contact face with a spherical cap as a convex depression, a reliable engagement of the tool-side contact element into the spindle-side contact element is ensured.

By virtue of the fact that the spindle-side contact element is arranged set back in relation to the planar face of the machine spindle, it is ensured that conventional coupling elements of inserted tools without contact elements can also be connected to the machine spindle.

The tool-side contact element is preferably arranged in an inclined guide which is open toward the planar annular face of the coupling element. It is shown that the orientation of the inclined guide in relation to the spindle axis of the machine spindle at an angle between 5° and 45°, preferably at an angle of 20°, is favorable for the quality of the galvanic contact of the contact elements. It is advantageous here if, starting from the rear face of the coupling element of the inserted tool, the inclined guide extends in relation to the spindle axis with a direction component which points toward the spindle axis.

The tool-side contact element can preferably be moved relative to the inclined guide. It is favorable to configure the tool-side contact element as a ball. The ball can be guided in a conical cage. The ball is pressed against the spindle-side contact element by way of a spring element. An elastic body, for example a helical spring, an elastic ball or else an elastomer body which surrounds the ball partially, can be provided as spring element.

The inclined holder on the tool holder of the machine spindle is sealed with respect to the planar face of the machine spindle against the penetration of liquid and dirt. In particular, a sealing ring can be provided for sealing. The inclined guide in the coupling element is sealed in the region of the rear face against the penetration of liquid and dirt. A sealing ring which is arranged in the inclined guide also proves favorable here as seal. A particularly reliable contact is possible by the second contact element being configured as a double contact.

It is possible to also arrange the tool-side contact element set back in relation to the rear face of the coupling element. The inserted tool can then also be operated on conventional machine spindles which do not have a galvanic contact point.

In the machine tool, a further, additional connecting point can be provided for data transmission. This connecting point is designed for contactless data transmission. A connecting point is therefore provided which is not susceptible to wear. The connecting point for contactless data transmission is designed, for example, for data transmission by means of induction or by means of capacitive coupling or by means of electromagnetic waves or for data transmission by means of light, in particular by means of laser light.

There is a holder for a spindle-side data transmission element on the planar face of the tool holder of the machine spindle for the contactless data transmission. A holder for a tool-side data transmission element is accordingly situated on the rear face, for example a planar annular face of the coupling element on the inserted tool. By virtue of the fact that the spindle-side data transmission element is arranged set back in relation to the planar face of the tool holder, the operation of inserted tools with conventional coupling elements in the machine tool is made possible. The holder is preferably a hole which is made in the planar face of the tool holder and extends parallel to the spindle axis. The tool-side data transmission element is arranged, preferably is set back, in a holder in the region of the planar annular face of the coupling element of the inserted tool. The holder for the second data transmission element is a hole which is made in the planar annular face of the inserted tool coupling element and extends parallel to the spindle axis.

By virtue of the fact that a plurality of galvanic contact points are provided for the transmission of electric current or of data between the machine spindle and the inserted tool, inserted tools with particularly powerful consumers can be operated or very large amounts of data can be exchanged between the machine spindle and the inserted tool.

The spindle-side contact element can be received in an exchangeable rail on the machine spindle. It is favorable to also integrate the tool-side contact element in a correspondingly exchangeable holding device which is received on the coupling element.

By virtue of the fact that the contact point for the transmission of electric energy and/or data and the connecting point for contactless data transmission are assigned an outlet for blown air, reliable cleaning of the contact point and connecting point in the case of contamination is made possible. The contact point or connecting point on the machine spindle can also be assigned a heating element for evaporating fluid, in order to make cleaning possible to counter contamination, in particular to counter contamination with cooling liquid.

A bearing device which is composed at least partially of polytetrafluoroethylene and/or silicone and/or rubber is preferably provided for the spindle-side contact element and/or the tool-side contact element.

The spindle-side contact element is connected to a cable which is laid on or in the machine spindle. A cable which is laid on or in the tool holder is connected to the tool-side contact element. This cable is preferably configured as a spiral cable.

An interface for transmitting electric energy and/or data into the machine spindle is provided in a rear section of the machine spindle.

BRIEF DESCRIPTION OF THE DRAWINGS

In the following text, the invention will be explained in greater detail using the exemplary embodiments which are shown in a diagrammatic way in the drawing, in which.

DETAILED DESCRIPTION

Figure 1:
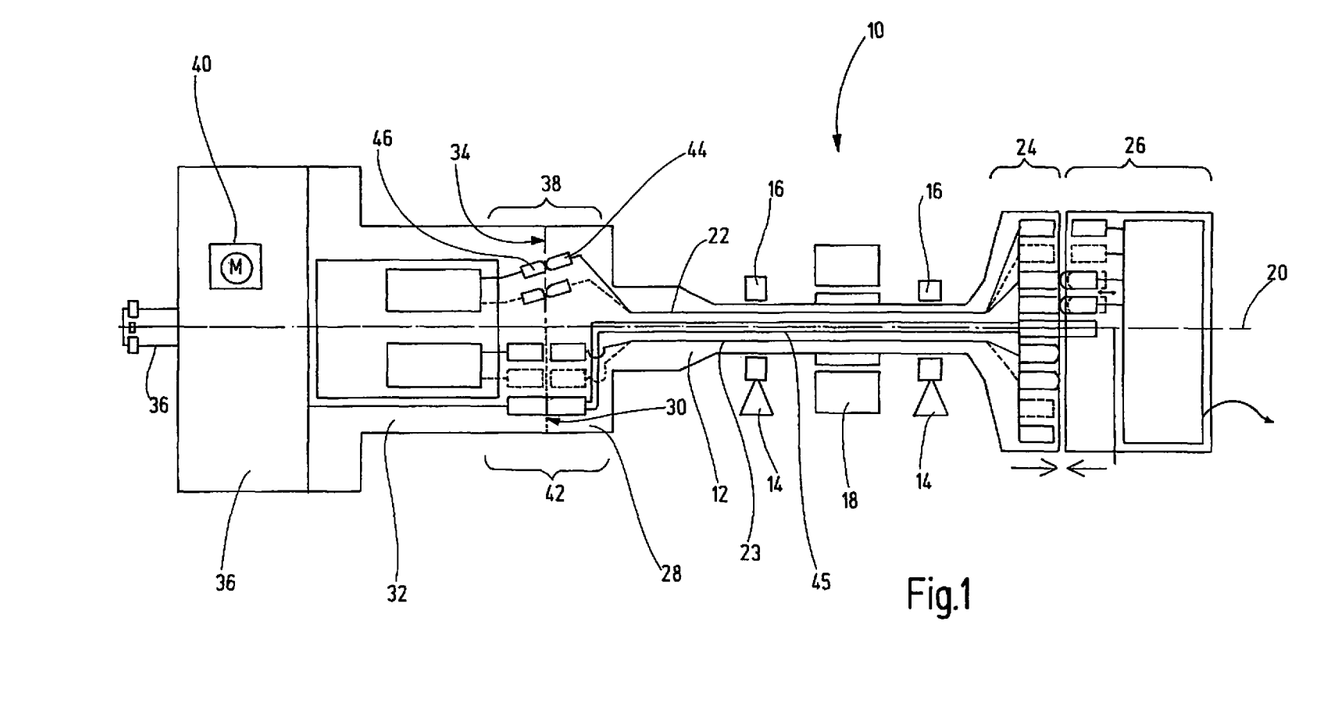
FIG. 1 shows a diagrammatic view of a machine tool with machine spindle and inserted tool.

FIG. 1 is a diagrammatic view of a machine tool 10. The machine tool 10 has a machine spindle 12. The machine spindle 12 is mounted rotatably in a rotary bearing 16 on a frame 14. An electric motor 18 is provided in the machine tool 10 as drive for the machine spindle 12. The machine spindle 12 can be rotated about the spindle axis 20 by means of the electric motor 18. The machine spindle 12 has a line section 22 for electric current, in order to transmit electric energy, and a line section 23 for data. The line section 22 for electric current is fed with electric energy from a stator 26 via a rotor 24 which is connected fixedly to the machine spindle 12 so as to rotate with it. Moreover, the stator 26 and the rotor 24 are designed for transmitting data from the stator 26 to the rotor 24 into the machine spindle and vice versa.

The machine spindle 12 has a tool holder 28 with a planar face 30. A mechatronic inserted tool 36 is connected on the tool holder 28 with a coupling element 32 which is compatible with the tool holder 28 of the machine spindle 12. The coupling element 32 has a planar annular face 34. The machine tool 10 has a galvanic contact point 38 for transmitting electric energy, in order to supply electric energy to a consumer 40 in the inserted tool 36, which consumer 40 is configured as an electric motor. A measuring device or measuring electronics in the inserted tool can of course also be supplied with electric current via the galvanic contact point 38. The galvanic contact point 38 for electric energy comprises a spindle-side contact element 44 and a tool-side contact element 46. Upon connection of the coupling element 32 to the machine spindle 12, the spindle-side contact element 44 and the tool-side contact element 46 are connected galvanically. Via the galvanic contact point 38, electric power in the order of magnitude of 100 watts or more can be transmitted from the machine spindle 12 into the inserted tool 36. In principle, data transmission via the galvanic contact point 38 is of course also possible.

In addition to the galvanic contact point, the machine tool 10 has a connecting point 42 for data, which connecting point 42 makes it possible to control the consumer 40 in the inserted tool 36 and to read out consumer operating parameters. The connecting point 42 for data is designed for the contactless transmission of data from the machine spindle 12 via the coupling element 32 into the inserted tool 36 and vice versa. In the case of contactless data transmission between the machine spindle 12 and the coupling element 32, electric power which preferably lies in the range of a few mW or µW is transmitted by the connecting point 42.

A line system 45 for coolant and blown air is provided in the machine spindle 12 of the machine tool 10. The line system 45 is connected to the stator 26 via the rotor 24. It makes the supply of coolant and blown air possible via the coupling element 32 to the inserted tool 36. This affords the possibility that the planar face 30 and the planar annular face 34 and the contact elements 44, 46 of the galvanic contact point 38 and the connecting point 42 can be blown free of contamination. This is of significance, in particular, during a tool change, since this takes place as far as possible only when the galvanic contact point 38 and the connecting point 42 are clean and dry. Therefore, short circuits, in particular, are avoided.

In order to free the galvanic contact point 38 and the connecting point 42 of contamination and in order to avoid short circuits, a heating device can also be provided which serves to evaporate liquid in the region of the contact point 38 and the connecting point 42. Furthermore, it is favorable to coat insulation faces at the interfaces with a material which repels liquid according to the principle of the lotus effect.

Figure 2:
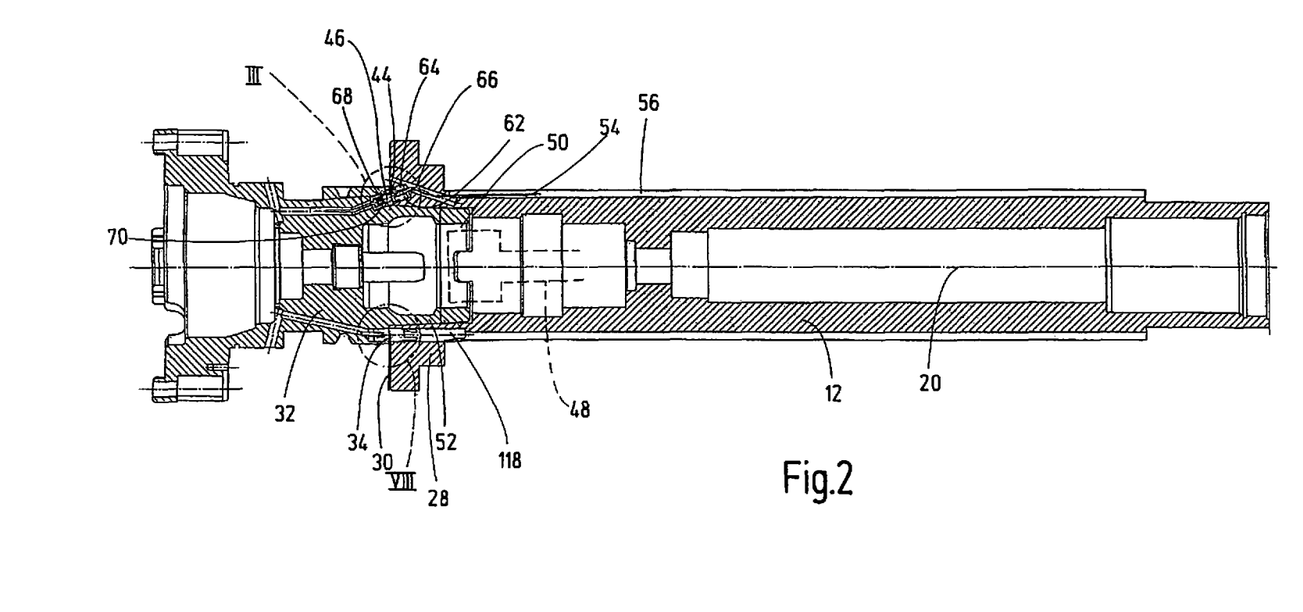
FIG. 2 shows a section of the machine spindle with a connected inserted tool coupling element.

FIG. 2 shows a section of the machine spindle 12 with the connected coupling element 32. The coupling element 32 has a hollow shaft cone interface. It is coupled to the machine spindle 12 by means of a clamping mechanism which can be actuated on the machine side via a pull rod 48. To this end, the pull rod 48 engages into a cavity 50 on the shaft 52 of the coupling element 32.

The machine spindle 12 contains an electric supply section 54 which is configured as an electric line. The electric supply section 54 is designed for transmitting electric power in the order of magnitude of 100 W or more. The supply section 54 serves to supply electric energy to a consumer 40 in the inserted tool 36. The electric supply section 54 is guided in a longitudinal groove 56 on the circumferential region of the machine spindle 12. As an alternative to this, the supply section 54 could also be laid through a longitudinal hole in the machine spindle 12. In order to suppress mechanical loading of the supply section 54 during the rotation of the machine spindle 12, the supply section 54 is sealed in this section on the machine spindle 12 in plastic, preferably in a synthetic resin.

The machine spindle 12 has a tool holder 28 with an end face which is configured as a planar face 30. The coupling element 32 bears with a rear face in the form of a planar annular face 34 against the planar face 30. During the coupling of the machine spindle 12 and the coupling element 32, the planar annular face 34 is pressed here against the planar face 30 with the production of a planar contact.

In principle, a connection of the coupling element 32 and the machine spindle 12 according to another interface principle is also possible, for example according to the ABS interface principle, the hollow shaft single cylinder interface principle, the steep taper interface principle or the Capto interface principle. It is important, however, that the coupling element 32 has a rear face 34 which, when the tool holder 28 is connected to the machine spindle 12, lies opposite the tool-side end face 30 of the machine spindle 12.

An inclined holder in the form of an inclined hole 62 is provided for the spindle-side contact element 44 on the planar side 30 of the machine spindle 12. The inclined hole 62 extends at an acute angle of 20° in an inclined manner with respect to the axis 20 of the machine spindle 12. A bearing device 64 for the contact element 44 is arranged in the inclined hole 62. The contact element 44 is connected to the electric supply section 54. The electric supply section 54 is configured as a spiral cable 66 in a section which points toward the planar face 30. This makes it possible that the bearing device 64 with the connecting contact 44 can be removed from the inclined hole 62 for maintenance work, without it being necessary here for the connection of the supply section 54 and the contact element 44 to be released.

Figure 3:
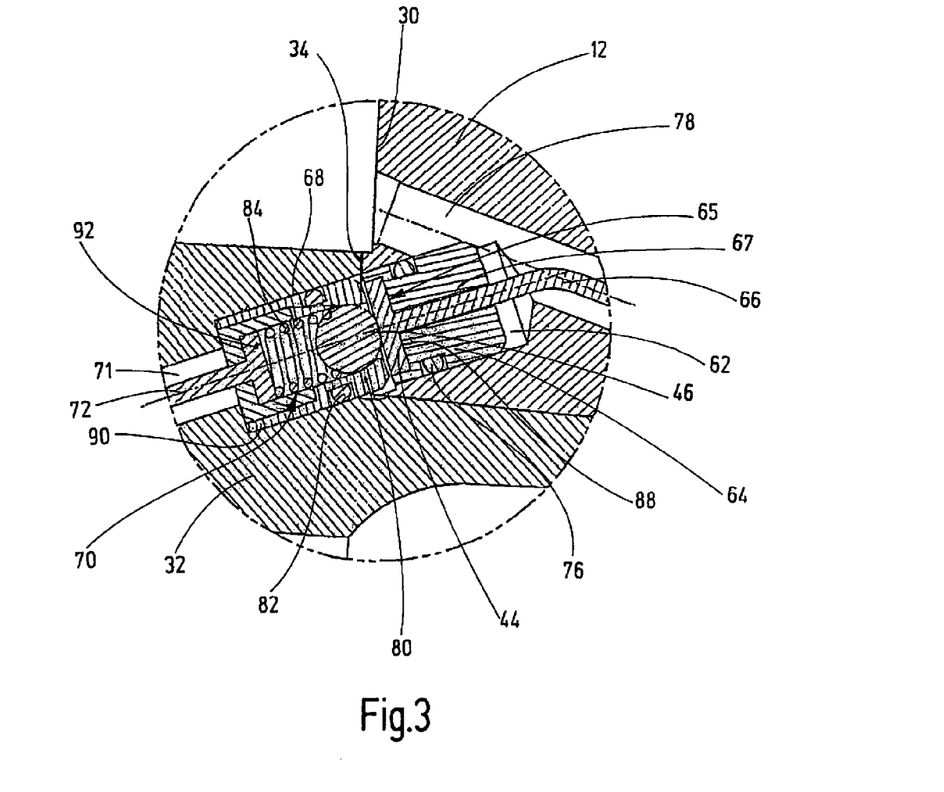
FIG. 3 shows an enlarged view of a contact point for transmitting electric energy and/or data in the section from FIG. 2.

FIG. 3 shows the detail III from FIG. 2 in an enlarged view. There is an inclined holder which is configured as an inclined hole 68 on the planar annular face 34 for the coupling element 32 on the machine spindle 12. The inclined hole 68 contains a bearing device 70 for the contact element 46. An electric connecting contact 46 which is configured as a conductive ball is received in the bearing device 70. Electric energy can be transmitted via the contact element 46 to the electric supply section 72 in the coupling element 32 of the inserted tool 36. The bearing device 70 in the inclined hole 68 acts as inclined guide for the contact element 46.

When the coupling element 32 is connected to the machine spindle 12, the inclined hole 62 is flush in the planar contact 30 of the machine spindle 12 with the inclined hole 68 in the annular face 34 of the coupling element 32. Via the planar contact 30 and the annular face 34, during operation of an inserted tool 36, very great torsion moments can be introduced by means of positive and nonpositive connection from the machine spindle 12 via the coupling element 32 into the inserted tool 36. Here, the inclined arrangement of the holes 62 and 68 in the planar contact 30 or the planar annular face 34 brings about an increased stiffness of the machine spindle 12 and the tool holder 32 in comparison with a parallel orientation of the holes in relation to the spindle axis 20. On account of the inclined arrangement, there are namely material bridges which lead to a high stability of the machine spindle 12 in the region of the planar contact 30 and of the coupling element 32 in the region of the planar annular face 34.

In order to make maintenance work possible on the bearing device 70 and the tool-side contact element 46, the supply section 72 likewise has a spiral cable section in the coupling element 32. Then, as on the machine spindle 12, the holding device 70 and the contact element 46 can be removed from the inclined hole 68, without electric contacts having to be released for this purpose.

The spindle-side contact element 44 is a disk-shaped electric conductor which is inserted into an end section of a cylindrical plastic body 64 which acts as a bearing device. The contact element 44 is situated in a circular recess 65 on the end side of the plastic body 64. The plastic body 64 is held by means of a sealing ring 76 in the inclined hole 62. The sealing ring 76 also prevents cooling medium which is used during operation of the machine tool 10 being able to pass via the inclined hole 78 to the contact element 44. The electric supply section 54 is laid through a central hole 67 in the plastic body 64 and is guided via an inclined hole 78 on the planar face 30 of the machine spindle 12 to the longitudinal groove 56 of the machine spindle 12. The bearing device 64 with the electric contact element 44 is arranged set back on the machine spindle 12 in relation to the planar face 30. That is to say, the contact element 44 does not protrude out of the planar face 30. A concave spherical cap 47 which is adapted to the connecting element 46 is formed on the contact element 44. This ensures that a conventional tool holder without an interface for transmitting energy and/or data can be connected readily to the machine spindle 12.

The contact element 46 is a ball which is composed of electrically conductive material. The ball 46 is guided on a sleeve-shaped conical cage 80.

The cross-sectional area of the cavity which is formed by the sleeve-shaped conical cage 80 and in which the ball 46 is received tapers in that section of the conical cage 80 which points toward the planar annular face 34 of the coupling element 32.

The ball 46 is pressed into the tapering region of the conical cage 80 by means of a helical spring 84. The tapering of the conical cage 80 ensures that the ball 46 is not moved out of the conical cage 80 despite the spring force which acts on it.

The tapering of the conical cage 80 is designed in such a way that the ball 46 protrudes with a spherical cap section 86 beyond an end region 88 of the conical cage 80. The ball 46 is therefore in contact with the electric contact element 44 in the machine spindle 12 when the tool holder 32 is connected to the machine spindle 12. This ensures that the ball which acts as electric contact element 46 lies on the electric contact element 44 despite the set-back arrangement of the holding device 64 on the machine spindle 12.

The conical cage 80 is composed of electrically insulating material. It is held with a sealing ring 82 in the inclined hole 68 of the tool holder 32. The sealing ring 82 avoids, in particular, coolant from penetrating into the conical cage 80 via the channel 71 for the supply section 72.

The spring 84 in the conical cage 80 is composed of electrically conductive material. It is arranged in a guide 90 in the conical cage 80. The spring 84 is supported against an electric connecting piece 92 which is connected to the supply section 72 in the tool holder 32.

During operation of the machine tool 10, the machine spindle 12 and the coupling element 32 are frequently rotated at high speed about the spindle axis 20. The tapering of the conical cage 80 is designed in such a way that the ball 46 can move in the direction of the contact element 44. Here, the spacing of the ball 46 from the spindle axis 20 is increased. There is therefore a slight play for the ball 46 in the conical cage 80. This has the consequence that the ball 46 is pushed against the contact element 44 on account of the centrifugal force or centrifugal force component which acts on it. The spring force, to which the ball 46 is exposed, is thus reinforced by the centrifugal force. The ball 46 then bears against the connecting contact 44 with pressure force.

In the machine tool 10, the contact point 38 has precisely one spindle-side galvanic contact element 44 and one tool-side contact element 46. Via this contact point, a phase connection of the consumer 40 in the inserted tool 36 is connected to the electric supply section 54 in the machine spindle. In contrast, the electric ground of the consumer 40 is laid through the annular face 34 of the inserted tool coupling element 32 and the planar face 30 of the machine spindle 12 to the machine spindle 12 which is grounded via a rotary bearing. As an alternative to this, it is of course also possible to provide one or more corresponding corotating galvanic contact points in an inserted tool, which contact points make a phase connection and a ground connection possible for a consumer in the inserted tool, in each case via a spindle-side and a tool-side contact element.

Figure 4:
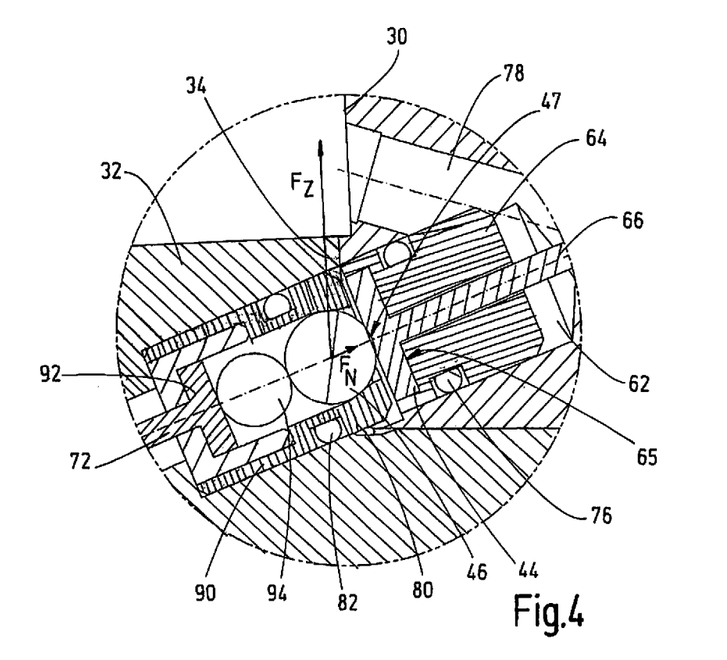
FIG. 4 shows a second alternative embodiment of a contact point for transmitting electric energy and/or data from the machine spindle into the coupling element of the inserted tool.

FIG. 4 shows an alternative embodiment of the contact point 38 from FIG. 1 for the transmission of electric energy out of the machine spindle 12 into the coupling element 32. The machine spindle-side section of the contact point 38 is configured as has been explained using FIGS. 2 and 3. Instead of the helical spring, however, the tool-side section of the contact point has an elastic ball 94 which is composed of electrically conductive material. As in the embodiment of the contact point explained using FIGS. 2 and 3, the elastic ball 94 presses the ball 46 which acts as contact element against the contact element 44. During rotation of the machine spindle 12, this is assisted by the centrifugal force component $F_N$ of the centrifugal force $F_Z$.

Figure 5:
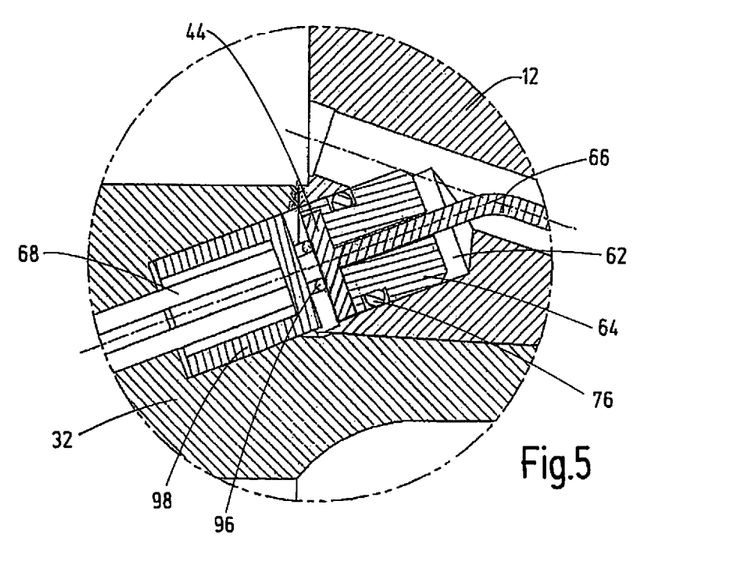
FIGS. 5 to 7 show further alternative embodiments of a contact point for transmitting electric energy and/or data from the machine spindle into the inserted tool.

FIG. 5 shows a further alternative embodiment of the contact point 38 from FIG. 1 for the transmission of electric energy out of the machine spindle 12 into the coupling element 32. The machine spindle-side section of the contact point is again configured as explained using FIGS. 2 and 3. On the coupling element 32, this contact point has an electric contact element which is configured as a sprung double contact 96. The sprung double contact 96 in turn is received in a bearing or holding device which is designed as a sleeve 98. The bearing of the double contact 96 against the contact element 44 is also assisted by the centrifugal force here.

Figure 6:
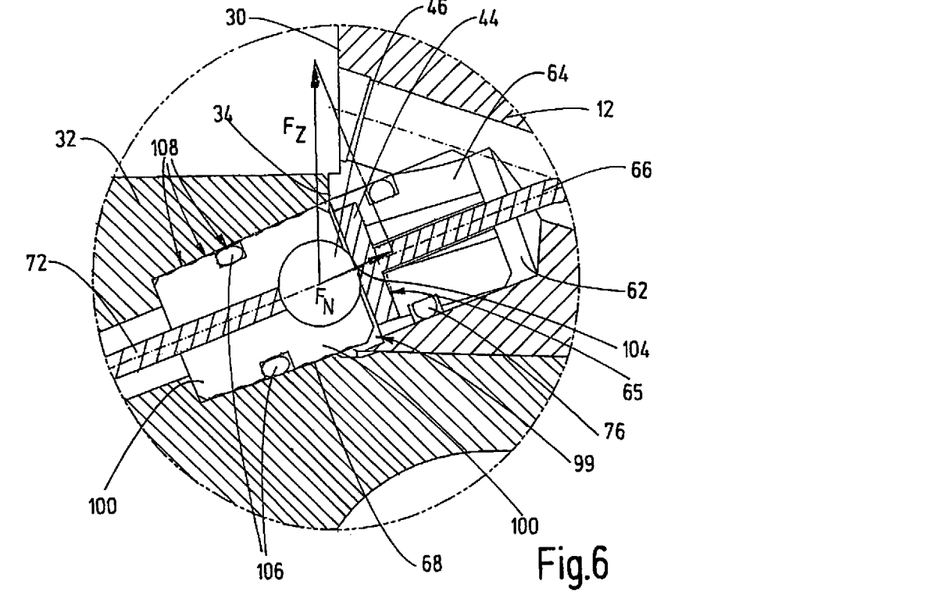

In the embodiment shown in FIG. 6 of the contact point for transmitting electric energy out of the machine spindle 12 into the coupling element 32, the inclined hole 68 is configured with a cone 99 which opens toward the planar annular face 34 of the coupling element 32. An elastomeric body 100 is arranged on this cone 99. Apart from a spherical cap section 104, the elastomeric body 100 surrounds a ball which acts as tool-side contact element 46. The ball 46 is connected to the electric supply section 72. A section of the supply section 72 is surrounded by the elastomeric body 100. The elastomeric body 100 is held in the coupling element 32 by means of an O-ring 106. It has an undulating outer contour 108, by means of which an additional sealing action is achieved. The elastomeric body 100 has a spring function and presses the ball 46 against the spindle-side contact element 44 when the coupling element 32 is connected to the machine spindle 12. The bearing of the ball 46 against the contact element 44 is also assisted here by the component $F_N$ of the centrifugal force $F_Z$. At the same time, the elastomeric body 100 stabilizes the ball 46 which acts as tool-side contact element. It is advantageous that the tool holder-side part can be mounted very simply in the case of this embodiment of the contact point: first of all, the ball 46 is embedded into the elastomeric body 100. The elastomeric body 100 is then inserted or pressed into the inclined hole 68. In the pressed-in position, it is then clamped or latched here. The elastomeric body 100 consists of a rubber material, for example silicone, the hardness of which can be set. As an alternative, it is possible also to configure the elastomeric body 100 from polytetrafluoroethylene material. The elastomeric body can then withstand very high operating temperatures. The dirt-repelling properties of polytetrafluoroethylene are also advantageous in this area of use in machine tools.

Figure 7:
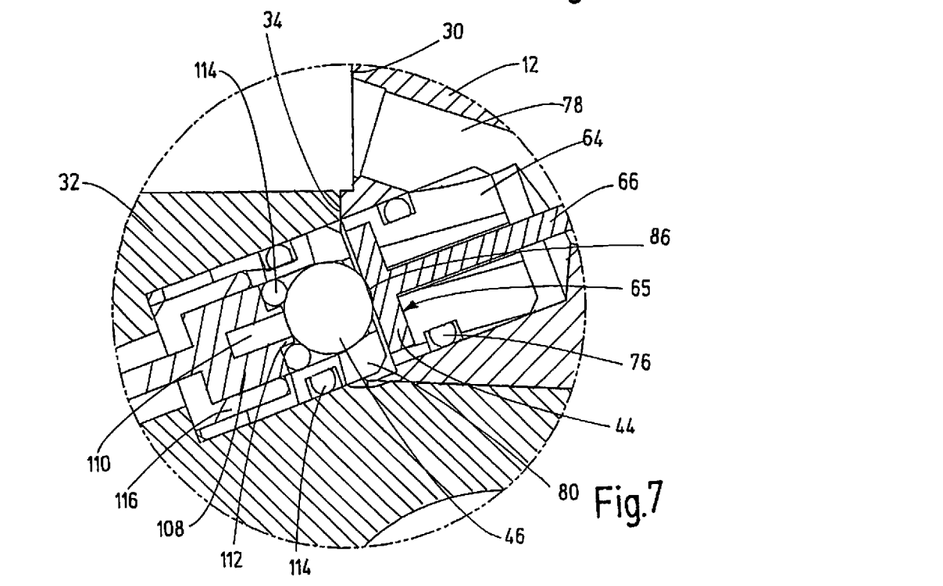

FIG. 7 shows a further alternative embodiment of the contact point 38 from FIG. 1 for the transmission of electric energy out of the machine spindle 12 into the coupling element 32. The machine spindle-side part of the contact point is again configured as explained using FIGS. 2 and 3. The contact point on the coupling element 32 has a ball 46 as electric contact element. The ball 46 is arranged in a conical cage 80 made from electrically insulating material. Here, the conical cage 80 is configured in such a way that the ball 46 protrudes with a spherical cap section 86 beyond an end region 88 of the conical cage 80. In the conical cage 80, the ball 46 bears against a conductor body 108, in which there is a blind hole 110. The conductor body 108 has a shaft 112 which is surrounded by an O-ring 114. The conductor body 110 is received in a guide 116 which is situated in a conical cage 80.

Figure 8:
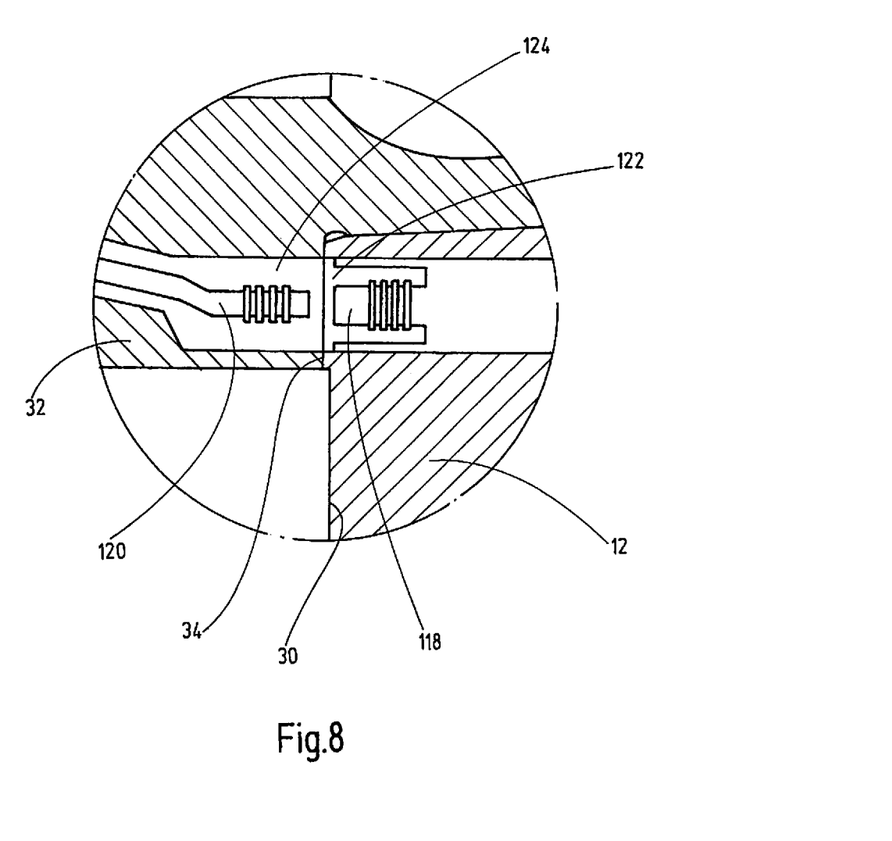
FIG. 8 shows an enlarged view of a connecting point for data transmission in the section from FIG. 2.

FIG. 8 shows the detail VIII from FIG. 2 in an enlarged view. The connecting point 42 for data transmission has an inductive data transmission element 118 which is arranged in the machine spindle 12. It comprises an inductive data transmission element 120 which is situated in the coupling element 32 of the inserted tool 36. The data transmission element 118 is situated in a hole 122 on the planar face 30 of the machine spindle 12. The hole 122 extends parallel to the spindle axis 20 in the machine spindle 12. A hole 124 is provided on the planar annular face 34 of the coupling element 32 for the data transmission element 120. This hole 124 also extends in the coupling element 32 parallel to the spindle axis 20 of the machine spindle 12. When the coupling element 32 bears against the machine spindle 12, the hole 124 is flush with the hole 122.

The connecting point for contactless data transmission can in principle also be used for data transmission by means of capacitive coupling, by means of electromagnetic waves or by means of light. The data transmission elements 118, 120 then correspondingly have to be configured as capacitances, as electromagnetic transmitters and receivers or as fiber-optic light guides.

Figure 9:
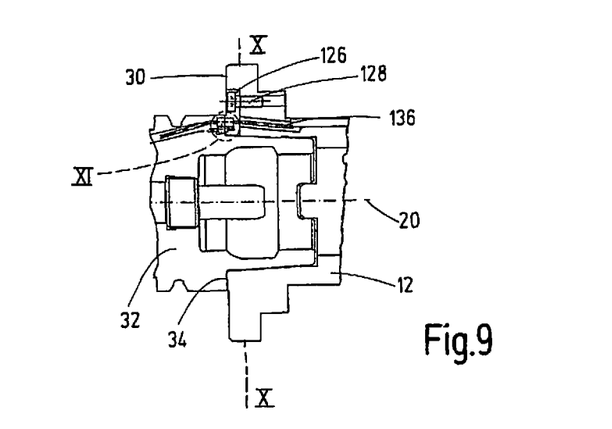
FIG. 9 shows a part section of an alternative embodiment of a machine spindle with a connected inserted tool coupling element.

FIG. 9 shows, as a part section, one alternative embodiment of a machine spindle 12 having a tool holder 28. A coupling element 32 is received in the tool holder 28. In turn, the coupling element 32 has a hollow shaft cone interface. Here, then, a common contact and connecting point 125 is provided for transmission of electric energy and data.

Figure 10:
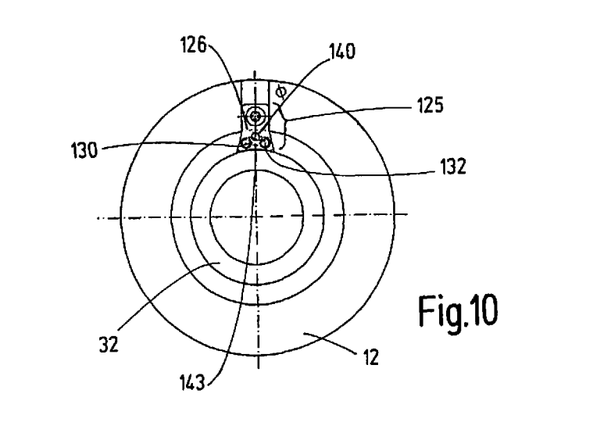
FIG. 10 shows a section of machine spindle and inserted tool coupling element along the line X-X from FIG. 9.

FIG. 10 is a section along the line X-X from FIG. 9. The machine spindle-side section of the contact and connecting point 125 is received in an exchangeable rail 126 on the end face 30 of the machine spindle 12, which end face 30 is configured as a planar face. The exchangeable rail 126 is fixed on the machine spindle 12 by way of a fastening screw 128. The rail 126 is flush with the planar face 30 of the machine spindle 12. The rail 126 is composed of stable material, for example of epoxy resin or of steel. It stabilizes the planar face 30 of the machine spindle 12. A first electric contact element 130 and a further electric contact element 132 are received in the rail 126, which contact elements 130, 132 serve to transmit electric energy out of a first and a second supply section 136 from the machine spindle 12 into the coupling element 32 of the inserted tool 36.

Figure 11:
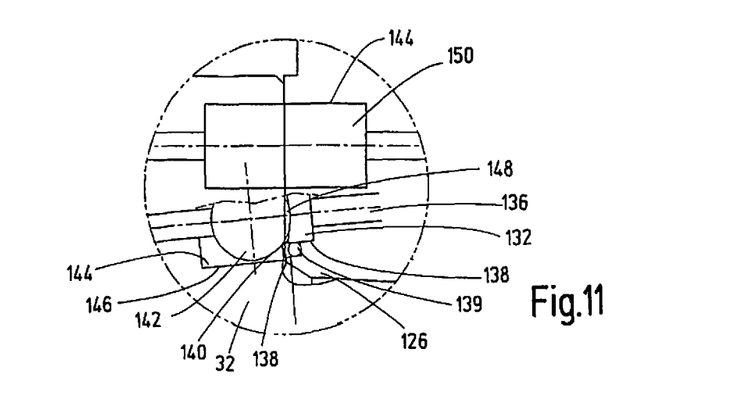
FIG. 11 shows an enlarged view of a contact and connecting point for transmitting electric energy and data from the part section according to FIG. 9.

FIG. 11 shows the detail XI from FIG. 9 in an enlarged view. The electric contact elements 130, 132 are situated in a holder 138 on the rail 126, which holder 138 is configured as an inclined hole.

The spindle-side electric contact element 132 is fixed in the holder 138 with an O-ring 139. The spindle-side contact element 132 has a concave surface 140. The concave surface is configured for the engagement of an associated contact element 142 which is designed as a ball and is situated in the coupling element 32 of the inserted tool 36.

The tool-side contact element 142 is arranged on the coupling element 32 in an elastomer body 144, for which a holder in the form of an inclined hole 146 is provided in the planar annular face 34 of the coupling element 32.

The inclined hole 146 is flush with the depression on the machine spindle 12, which depression is configured as an inclined hole 138, when the coupling element 32 is connected to the machine spindle 12. However, it is also possible in principle that the inclined holes 138, 146 are at an angle with respect to one another.

The tool-side contact element 142 which is configured as a ball protrudes with a spherical cap section 148 out of the elastomer body 144. In a similar manner as in that embodiment of the contact point which is described using FIG. 7, the elastomer body 144 of the spherical tool-side contact element 142 presses against the spindle-side contact element 132. This pressing force is reinforced under the action of the centrifugal force during the rotation of the machine spindle 12. For exchanging and cleaning the machine spindle-side section of the interface 125, the fastening screw 128 for the rail 126 merely has to be released.

In addition, a data transmission element 150 is integrated into the rail 126. The data transmission element 150 is received on the exchangeable rail 126 in a hole 144 which is preferably oriented parallel to the spindle axis 20 and acts as a holder.

The machine spindle 12 has a channel for blown air, which channel has an outlet opening 143 on the rail 126. This makes it possible to blow the contact and connecting point 125 for energy and data transmission free of contamination by way of blown air.

Figure 12:
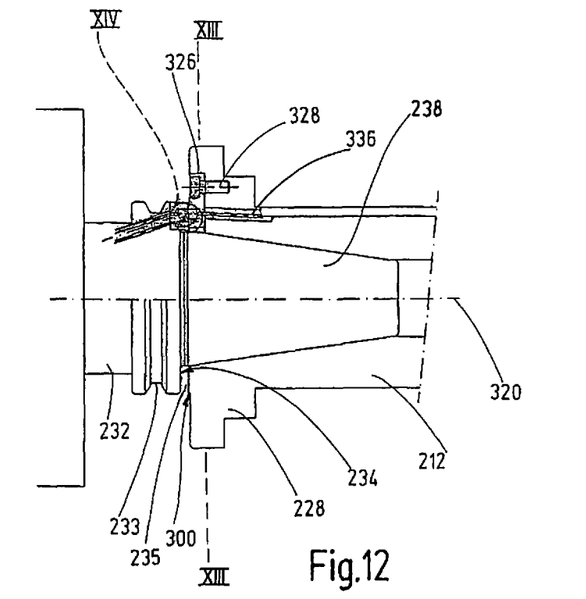
FIG. 12 shows a part section of a further alternative embodiment of a machine spindle with a connected inserted tool coupling element.

FIG. 12, as a part section, a further alternative embodiment of a machine spindle 212 with a tool holder 228. A coupling element 232 is received in the tool holder 228. The coupling element 232 has an interface with steep taper 238. A common contact and connecting point 325 is also provided here for transmitting electric energy and data. A gripper groove 233 is formed on the coupling element 232, which gripper groove 233 has a rear face 234 which points toward the end face 300 of the tool holder 228 of the machine spindle 212 with the spindle axis 320. This rear face 234 can also be of segment-like configuration. There is an air gap 235 here between the rear face 234 of the coupling element 232 and the end face 300 of the tool holder 228. The rear face 234 of the coupling element 232 and the end face 300 of the tool holder 228 therefore do not form a planar contact here.

Figure 13:
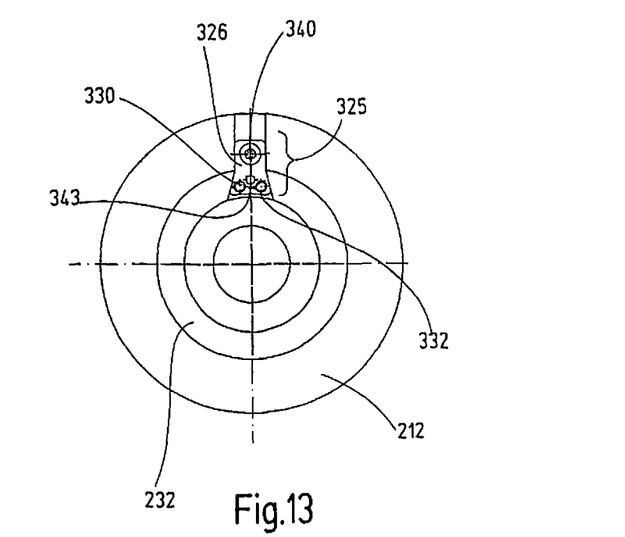
FIG. 13 shows a section of a machine spindle and inserted tool coupling element along the line XIII-XIII from FIG. 12.

FIG. 13 is a section along the line XIII-XIII from FIG. 12. The machine spindle-side section of the contact and connecting point 325 is configured as explained using FIG. 10. It is provided in an exchangeable rail 326 on the end face 300 of the tool holder 328 of the machine spindle 212. In order to explain the assemblies of the machine spindle-side contact and connecting point, reference is made to the figure description of FIG. 10. In comparison with FIG. 10, corresponding assemblies in FIG. 13 have reference numerals which are increased by the number 200. A first electric contact element 330 and a further electric contact element 332 are received in the rail 326, which contact elements 330, 332 serve to transmit electric energy out of a first and a second supply section 336 from the machine spindle 212 into the coupling element 232 of the inserted tool.

Figure 14:
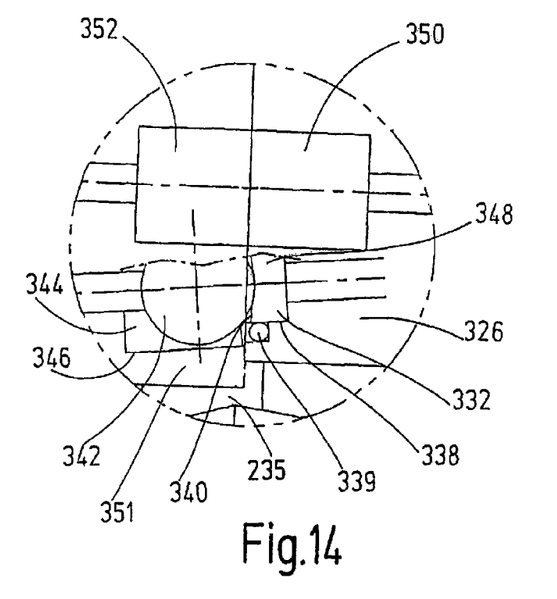
FIG. 14 shows an enlarged view of a contact and connecting point for transmitting electric energy and data from the part section according to FIG. 12.

FIG. 14 shows the detail XIV from FIG. 12 in an enlarged view. The electric contact elements 330, 332 are situated on the rail 326 in a holder 338 which is configured as an inclined hole. The spindle-side electric contact element 332 is therefore fixed in the holder 338 with an O-ring 339. The spindle-side contact element 332 has a concave surface 340. The concave surface is configured for the engagement of an associated contact element 342 which is designed as a ball and is situated in the coupling element 232 of the inserted tool. The tool-side contact element 342 is situated in an exchangeable holding device 351 which is received on a segment of the gripper groove arrangement 233 on the rear face 234 of the coupling element 232. In the holding device 350, the tool-side contact element 342 is arranged in an elastomer body 344, for which a holder is provided there in the form of an inclined hole 346.

The inclined hole 346 is flush with the depression on the machine spindle 212, which depression is configured as an inclined hole 338, when the coupling element 232 is connected to the machine spindle 212. However, it is also possible in principle that the inclined holes 338, 346 are at an angle with respect to one another.

The tool-side contact element 342 which is configured as a ball protrudes with a spherical cap section 348 out of the elastomer body 344. As in the case of the embodiment of the contact point described using FIG. 7, the elastomer body 344 of the spherical tool-side contact element 342 presses against the spindle-side contact element 332. This pressure force is reinforced under the action of the centrifugal force during the rotation of the machine spindle 212.

A data transmission element 350 is integrated into the rail 326 on the machine spindle 212. Here, the data transmission element 350 is received in a hole 344 which is oriented parallel to the spindle axis 20 and acts as a holder. The data transmission element 350 is assigned a data transmission element 352 which is situated in a hole in the holding device 351.

The data transmission elements 350, 352 are designed for the contactless transmission of data from the machine spindle 212 to the coupling element 228 and vice versa. The holding device 351 which is received on the coupling element 228 for the electric contact element 342 and the data transmission element 352 bears with a small air gap against the rail 326 on the coupling element 232 of the machine spindle. In order to avoid the penetration of dirt, this air gap is preferably only a few micrometers. However, it is also possible that the surfaces of the holding device 351 and the rail 326 bear directly against one another.

In summary, the following should be noted: the invention relates to a machine tool 10 having a motor-driven machine spindle 12 which can be rotated about a spindle axis 20. The machine spindle 12 has an end-side tool holder 28. An inserted tool 36 is arranged exchangeably on the machine spindle 12. The inserted tool 36 has a coupling element 32 which is compatible with the tool holder 28 of the machine spindle 12. The coupling element 32 has a rear face 34 which points toward the machine spindle. The tool holder 28 comprises an end face 30 which lies opposite the rear face 34 of the coupling element 32. The machine tool has at least one galvanic contact point 38 for electric current or data transmission, which contact point 38 is arranged between the machine spindle 12 and the inserted tool 36 and corotates with the machine spindle 12. The galvanic contact point has a spindle-side contact element 44 which is arranged on the end face 30 of the tool holder 28 and a tool-side contact element 46 which is arranged on the rear face 34 of the coupling element 32. The spindle-side contact element 44 and the tool-side contact element 46 can be moved relative to one another under the action of a centrifugal force component which occurs during the rotation of the machine spindle 12 about the spindle axis 20, and can be pressed against one another with the production of contact.

The invention claimed is:

1. A machine tool having a motor-driven machine spindle which can be rotated about a spindle axis and has an end-side tool holder, and having an inserted tool which is arranged exchangeably on the machine spindle and has a coupling element which is compatible with the tool holder of the machine spindle and has a rear face which points to the machine spindle, having an end face which comprises the tool holder and lies opposite the rear face of the coupling element, and having at least one co-rotating galvanic contact point for electric current or data transmission, which contact point is arranged between the machine spindle and the inserted tool and has a spindle-side contact element which is arranged on the end face of the tool holder and a tool-side contact element which is arranged on the rear face of the coupling element, characterized in that the spindle-side contact element and the tool-side contact element can be moved relative to one another, under the action of a centrifugal force component which occurs during the rotation of the machine spindle about the spindle axis, and can be pressed against one another with the production of contact.

2. The machine tool as claimed in claim 1, characterized in that the spindle-side contact element or the tool side contact element can be moved in a direction under the action of the centrifugal force component away from the spindle axis and towards the tool-side or the spindle-side contact element.

3. The machine tool as claimed in claim 1, characterized in that the spindle-side contact element is arranged in an inclined holder which forms an acute angle with the spindle axis and opens toward the planar face of the machine spindle.

4. The machine tool as claimed in claim 3, characterized in that the acute angle is from 5° to 45°.

5. The machine tool as claimed in claim 3, characterized in that, starting from the end face of the machine spindle, the inclined holder extends in a direction which points away from the spindle axis.

6. The machine tool as claimed in claim 3, characterized in that the inclined holder is sealed with respect to the end face of the machine spindle against the penetration of liquid and dirt.

7. The machine tool as claimed in claim 1, characterized in that the spindle-side contact element is arranged rigidly in the machine spindle.

8. The machine tool as claimed in claim 1, characterized in that the spindle-side contact element has a planar contact face with a spherical cap as convex depression.

9. The machine tool as claimed in claim 1, characterized in that the spindle-side contact element is arranged set back in relation to the end face of the machine spindle.

10. The machine tool as claimed in claim 1, characterized in that the tool-side contact element is arranged in an inclined guide which is open toward the rear face of the coupling element.

11. The machine tool as claimed in claim 10, characterized in that the inclined guide is oriented in relation to the spindle axis at an angle between 5° and 45°.

12. The machine tool as claimed in claim 10, characterized in that, starting from the rear face of the inserted tool, the inclined guide extends in relation to the spindle axis with a direction component which points toward the spindle axis.

13. The machine tool as claimed in claim 1, characterized in that the rear face of the coupling element is a planar annular face which surrounds the coupling element, and the end face of the tool holder is configured as a planar face, against which the planar annular face can be pressed during the coupling operation with the formation of a planar contact.

14. The machine tool as claimed in claim 1, characterized in that the tool-side contact element can be moved relative to the inclined guide.

15. The machine tool as claimed in claim 14, characterized in that the tool-side contact element is configured as a ball.

16. The machine tool as claimed in claim 15, characterized in that the ball is guided in a conical cage.

17. The machine tool as claimed in claim 15, characterized in that a spring element which acts against the ball in the direction of the spindle-side contact element is arranged in the inclined guide.

18. The machine tool as claimed in claim 17, characterized in that the spring element is an elastic body.

19. The machine tool as claimed in claim 17, characterized in that the spring element is an elastic ball.

20. The machine tool as claimed in claim 17, characterized in that the spring element is an elastomer body which surrounds the ball partially.

21. The machine tool as claimed in claim 10, characterized in that the inclined guide in the coupling element is sealed in the region of the rear face against the penetration of liquid and dirt.

22. The machine tool as claimed in claim 1, characterized in that the tool-side contact element is configured as a double contact.

23. The machine tool as claimed in claim 1, characterized in that the tool-side contact element is arranged set back in relation to the rear side of the coupling element.

24. The machine tool as claimed in claim 1, characterized in that a co-rotating connecting point is provided for the data transmission between the machine spindle and the inserted tool, which connecting point has a spindle-side and a tool-side data transmission element.

25. The machine tool as claimed in claim 24, characterized in that the connecting point is designed for contactless data transmission.

26. The machine tool as claimed in claim 25, characterized in that the connecting point forms an inductive, capacitive, electromagnetic or optical transmission path.

27. The machine tool as claimed in claim 24, characterized in that the spindle-side data transmission element is arranged in a holder in the region of the planar face of the tool holder of the machine spindle.

28. The machine tool as claimed in claim 27, characterized in that the spindle-side data transmission element is arranged set back in relation to the end face of the tool holder.

29. The machine tool as claimed in claim 27, characterized in that the holder is a hole which extends parallel to the spindle axis.

30. The machine tool as claimed in claim 24, characterized in that the tool-side data transmission element is arranged in a holder in the region of the planar annular face of the coupling element of the inserted tool.

31. The machine tool as claimed in claim 30, characterized in that the tool-side data transmission element is arranged set back in relation to the rear face.

32. The machine tool as claimed in claim 30, characterized in that the holder is a hole which extends parallel to the spindle axis.

33. The machine tool as claimed in claim 24, characterized in that the co-rotating connecting point for the data transmission is assigned an outlet for blown air.

34. The machine tool as claimed in claim 1, characterized by at least two co-rotating galvanic contact points which are arranged between the machine spindle and the inserted tool for electric current or data transmission.

35. The machine tool as claimed in claim 1, characterized in that the spindle-side contact element is received in an exchangeable rail on the machine spindle.

36. The machine tool as claimed in claim 1, characterized in that the tool-side contact element is received in an exchangeable rail on the coupling element of the inserted tool.

37. The machine tool as claimed in claim 1, characterized in that the co-rotating galvanic contact point is assigned an outlet for blown air.

38. The machine tool as claimed in claim 1, characterized in that the spindle-side contact element is connected to a spiral cable which is laid on or in the machine spindle and/or the tool-side contact element is connected to a cable, which is laid on or in the coupling element of the inserted tool.

39. The machine tool as claimed in claim 1, characterized in that a bearing device which is composed at least partially of polytetrafluoroethylene and/or silicone and/or rubber is provided for the spindle-side contact element and/or the tool side contact element.

40. The machine tool as claimed in claim 1, characterized in that the tool-side contact element is received in an exchangeable holding device in the region of the rear face of the coupling element.

41. The machine tool as claimed in claim 1, characterized in that an interface for transmitting electric energy and/or data into the machine spindle is provided in a rear section of the machine spindle.

42. A machine spindle for a machine tool as claimed in claim 1.

43. An inserted tool having a coupling element for a machine tool as claimed in claim 1.

* * * * *